Oct. 6, 1925.

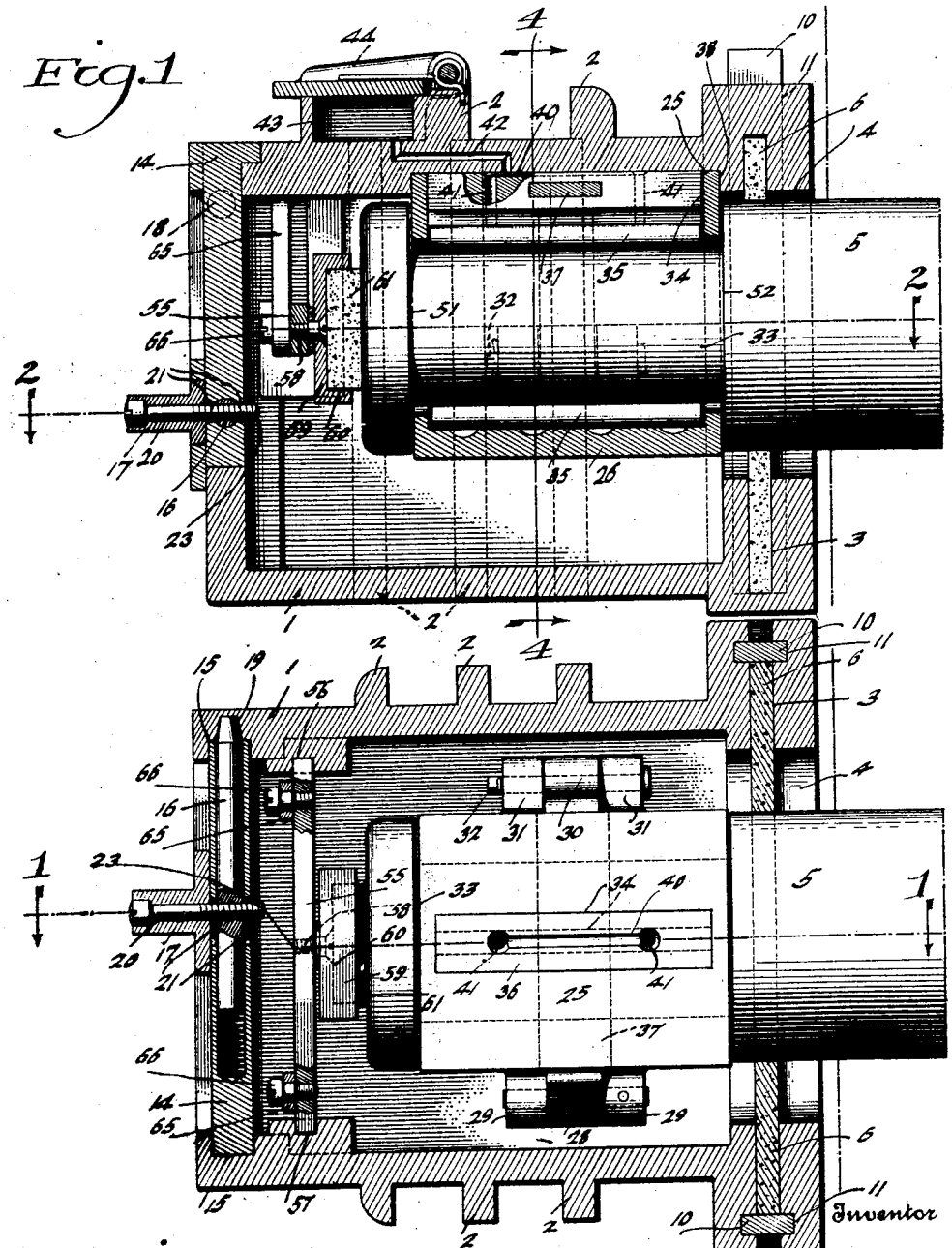

J. G. SMITH 1,556,258

JOURNAL BOX AND BEARING

Filed Nov. 14, 1923   2 Sheets-Sheet 2

Inventor
James G. Smith
By Wood·Wood
Attorneys

Patented Oct. 6, 1925.

1,556,258

UNITED STATES PATENT OFFICE.

JAMES G. SMITH, OF WESTWOOD, OHIO, ASSIGNOR TO JAMES H. SMITH, OF WESTWOOD, CINCINNATI, OHIO.

JOURNAL BOX AND BEARING.

Application filed November 14, 1923. Serial No. 674,779.

*To all whom it may concern:*

Be it known that I, JAMES G. SMITH, a citizen of the United States, and residing at Westwood, Cincinnati, Ohio, in the county of Hamilton and State of Ohio, have invented a new and useful Improvement in Journal Boxes and Bearings, of which the following specification is a full disclosure.

This invention relates to journal boxes such as are used on passenger coaches or freight cars and the like, one object being to provide a journal box in which the use of waste packing for lubricating purposes is dispensed with.

Another object of the invention is to provide a roller bearing for the journal box instead of the usual brasses, the roller bearing herein being of sectional structure and having removable engagement with the interior of the box.

Another object is to provide a sectional roller bearing which can be initially attached to the journal and introduced with the journal into the box, which box is provided with means for holding the bearing within the box against lateral displacement.

Another object is to provide a roller bearing having hollow half sections hinged together, the said sections adapted to be brought together about an axle, one of said sections providing an aperture through which the roller bearings may be introduced within the bearing and about the axle after the bearing has been attached to the axle.

Another object is to provide a sectional bearing of the above character in which the top section, which sustains the greatest wear, has a bore providing a maximum bearing surface, and in which the bore of the bottom section has circumferential oil grooves therein.

Another object is to provide a journal thrust-receiving device for limiting end play of the journal and preventing engagement thereof against the ends of the bearing.

Another object is to provide an oiling device for the removable bearing, as a reservoir accessible at the exterior of the box, for filling.

Another object is to provide a dust-tight door and means for locking the same in closed and open positions, and to provide stop means for preventing accidental disengagement of the door from its guides.

Another object is to provide a latch actuating knob fastening device which acts as a door stop to prevent accidental removal of the door, the said device being adjustable to permit and prevent removal of the door from its guides without disassembly of the latch mechanism or latch actuating knob.

Another object of the invention is to provide dust-tight closures for closing the box at that end through which the journal axle is introduced, and means for locking the closure elements against displacement.

Other objects and certain advantages will be disclosed in the description of the drawings forming a part of this specification, in which:

Figure 1 is a vertical, central longitudinal section on line 1—1, of Fig. 2.

Figure 2 is a plan section on line 2—2, of Fig. 1.

Figure 3:
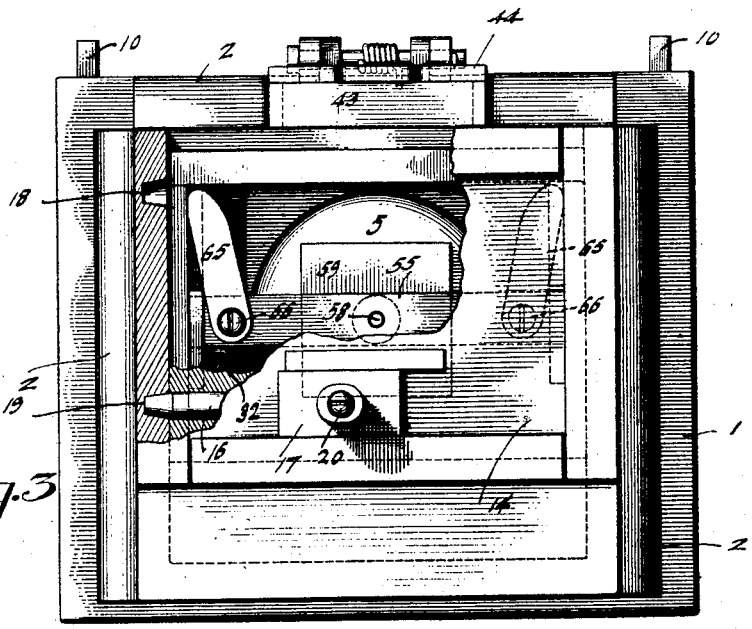
Figure 3 is an end view partially broken away to show certain interior structure.

The numeral 1 designates the journal box or casing proper which is herein of rectangular configuration in the form of a hollow casting, and is provided with parallel lugs 2 upon its top and sides forming therebetween the usual grooves for attaching the boxing to the car body. The box is further provided in its inner end wall with the cross-slit or groove 3, opening at opposite sides of the box and intersecting an opening 4 through which the end of the journal or shaft 5 is adapted to be introduced. The opening 4 is substantially of the configuration shown in Fig. 4 and is designed to permit, in addition to the introduction of the axle 5, the introduction of a sectional bearing hereinafter more fully described, which bearing is adapted to be attached removably to and support the outer circumferentially grooved end of the shaft 5.

After assembly, the plates 6 are introduced into the slots 3 at opposite sides of the shaft or axle, acting as dust-proof closures, preferably of fibrous material, and virtually conforming to the configuration of the axle at the point of engagement therewith. Locking strips 10 are introduced into vertical slots 11 traversing the slots 3, against which strips the elements 6 abut and are held from displacement. The outer side of the journal box is closed by a removable dust-tight door 14 slidable in vertical grooves 15 formed in the opposite side walls of the box, the door 14 having a latch bolt 16 slidable in a horizontal plane and operable by a finger piece 17. That wall adjacent the projecting end of the bolt 16 is provided with upper and lower openings respectively 18, 19, engageable by the conical end of the bolt 16 for locking the door respectively in closed and open position.

The spring pressed bolt 16 is slidable within a bore of the door, and the finger piece or knob 17 is attached to the bolt by a screw 20 passing through the knob, parallel slots 21, and bolts 16, and projecting beyond the door at the interior of the box as at 23. The screw thus acts as a means for attaching the operating knob to the bolt and also as a stop for limiting upward movement of the door and preventing its accidental displacement from the guide grooves 15. The opening 18 is so placed with reference to the lower face of the upper wall of the box and to the bolt that when the end 23 of the screw engages the lower surface of the wall, the bolt will be positioned for entrance into the opening 18, said stop thus acting as means for obtaining registration between the locking bolt and its opening, and for preventing accidental removal of the door from its guides. When it is desired to remove the door the screw 20 is withdrawn until its inner end is flush with the inner face of the door, without disengaging the screw from the bolt, and thus the bolt can be operated as usual and the door can also be removed.

Figure 4:
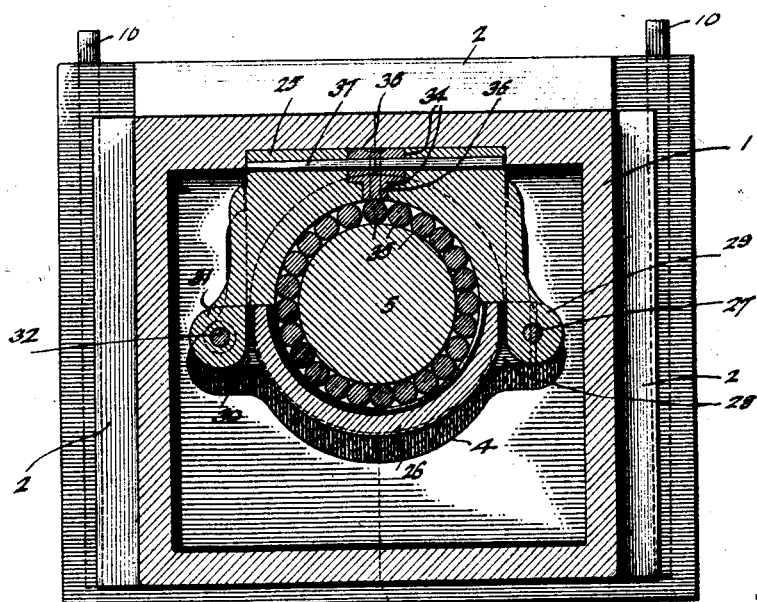
Figure 4 is a vertical transverse section on line 4—4, of Fig. 1.

The journal bearing herein comprises the hollow half sections 25, 26, respectively upper and lower, hinged together substantially at their parting line by a pin 27 passing through lugs 28, 29, respectively, formed upon the cast sections 25, 26. Similar lugs 30, 31, are formed diametrically opposite to the first-mentioned lugs and are bored to receive a locking pin 32. The sections are adapted to be engaged and brought together about the axle 5, which axle is provided with the circumferential groove 33 adjacent its outer end, the bearing being engaged within this groove and adapted to be locked about the axle in such a manner as to allow some axial play between the bearing and axle. The bearing herein is of the roller type and in order to introduce the roller bearings between the outer surface of the groove portion and the inner surface of the cooperative sections of the bearing after the sections have been locked upon the journal or axle and within the groove, a longitudinally disposed slot 34 is provided in the upper wall of the top section. The slot is of sufficient width to allow the introduction of the roller elements 35, and the said rollers are successively introduced until the proper number have been placed. A closure block 36 is provided and fitted within the slot 34 as shown in Fig. 4, and a tapered locking element 37 traverses an opening in the closure 36 to hold the same against accidental displacement. A conveniently detachable and removable bearing is thus provided which is locked about the end of the axle, and the bearing is adapted to be introduced into the box after assembly on the shaft, through the opening 4, and then slightly raised above and out of alignment with the opening. The box is further provided in its upper wall with a recess 38 into which recess, after introduction of the bearing into the box, the said bearing is engaged to prevent lateral movement of said bearing and displacement thereof. Means may be provided for removably fastening the bearing within the recess 38, but as herein shown, the box rests by gravity upon the bearing and by means of the recess is held from moving laterally relative thereto.

In order to oil the roller members the closure section 36 is longitudinally grooved or channelled as at 40 and vertically bored as at 41 to provide oil passages communicating with the groove 40 and the interior of the bearing. A passage 42 leads from a cavity 43, formed at the outer side upon the upper wall of the box, and communicates with the channel 40. The cavity or receptacle 43 is in practice formed by casting to provide a chamber wherein oil or oil-soaked packing is adapted to be placed, the said chamber being closed by a spring actuated door 44, which door is adapted to tightly close the cavity and at times to exert a pressure upon the packing to squeeze the oil therefrom, to cause the oil to traverse the passages 42, 40 and 41, and arrive at the interior of the bearing.

The sections of the bearing are generally formed of bronze, the bore of the upper section being plain or smooth throughout its length to provide unbroken bearing surfaces, inasmuch as the greatest wear is upon the bore of the upper section. The bore of the lower section has the circumferential grooves 26$^a$ which are initially packed with grease before assembly of the bearing about and within the groove portion of the axle or journal.

A slight end play is provided between the end walls of the bearing and the shoulders 50, 51, formed by circumferentially grooving the outer end of the axle, and end thrusts upon the end walls of the casings of the sectional bearing is prevented by a novel device now to be described.

The thrust device comprises a bar 55 removably engaged with supporting and guide grooves 56, 57, in supports and guides placed opposingly at relatively opposite sides and interiorly of the box in diametric relation to the journal axis. The bar is in this instance disposed horizontally adjacent to and in diametric relation with the inner end of the axle 5, or that end which projects beyond the bearing interiorly of the box.

Rotatively pivoted or swiveled to the bar as at 58 is a block 59 recessed as at 60 for the reception of a renewable section of relatively soft material 61 preferably of fibrous nature, the inner surface of the material being engaged with the outer surface of the shaft. The block 59 is thus free to rotate with the journal to prevent turning or accidental displacement of the bar. The bearing 55 is also adapted to be locked in its operative position by means of latch members 65 pivoted as at 66 adjacent opposite ends of the bar and near the guide grooves. The latches 65 are adapted, as shown in Fig. 3, to have their upper or outer ends engaged against the vertical side walls of the box and slanting outwardly beyond their pivotal centers so that gravity will prevent them from displacement inwardly in such manner as to annul their locking action.

Although a full truck assembly has not herein been shown, it will be understood that when two boxes are attached to the car body in proper relation to the ends of the axle and wheels thereon, the inner faces of respective thrust receiving bars will be so related to the corresponding opposing end faces of the axle that, while slight compensating lateral play of the axle is allowed in the bearings, the end thrusts of the axle will be received and sustained by the bars, and engagement of the shoulders 51, 52, of the axle with the bearing will be prevented.

Minor changes in the detail of construction may be made without departing from the spirit of the invention and such minor changes are contemplated.

The specific fastening means for preventing displacement of the elements 6 may be dispensed with and the elements held by cross-pins traversing the flanged end of the box. The means for locking the element 36 may also be modified or the means dispensed with, and the construction of the knob 17 for operating the door securing bolt 16 may be modified. The bar 55 may also be held against vertical displacement or disengagement from the slots 56 by cross-pins passing through the inwardly extending projections or supports in which the slots are formed.

A bearing is herein provided which may be attached to the axle before the same is introduced into the box, and the provision of a bearing of this character avoids the use of the usual packing waste used in the boxes, which lessens the possibility of a hot box inasmuch as a supply of lubricant is constantly delivered directly to the friction surfaces of both bearing and axle.

Having thus described my invention, what I claim is:

1. A journal bearing comprising hollow half sections hinged together at one side substantially at their parting line, said sections adapted to be brought together and engaged about an axle, to provide a bearing therefor, the top section of said bearing having a longitudinally disposed slot therein, to provide for the radial introduction of roller bearings into the bearing and about the axle after said bearing has been attached thereabout, and means for locking the sections together.

2. A journal box, a journal bearing therein, a journal within the bearing having its end extending therebeyond at the interior of the box, opposingly related vertically disposed non-yielding vertical guides upon the inner side walls of the box adjacent the inner end of said bearing and diametrically related to the axis of the journal, a bar removably engaged with said guides, a wear block swiveled to said bar engageable by the end of said journal, and means pivoted to said bar adapted to engage the sides and top walls of the box to prevent accidental upward displacement of said bar from its guides, whereby the end thrust of the journal is received by the block and bar, and whereby the block is locked against accidental upward displacement, but may be conveniently removed from its guides for replacement of the wear block.

3. A journal having a circumferential groove, a roller bearing for said journal comprising half sections hinged together removably engaged about said journal and within said groove and locked in a manner to allow slight axial movement relative to the bearing, one of said sections having a longitudinal opening therein for radial introduction of rollers within the bearing while attached to the journal.

4. A journal having a circumferential groove, a journal bearing for said journal comprising hollow half sections hinged together at one side, said sections adapted to be opened as a hinge and removably engaged about said journal and within said groove to provide an anti-translatable bearing for the journal, the top section of said bearing having an opening therein for the radial introduction of roller bearings into the bearing and about the axle longitudinally thereof after said bearing has been attached to the axle, and means for locking the sections together.

5. A journal box, a journal bearing therein, a journal within said bearing having one of its ends extending therebeyond at the interior of the box, guide elements on opposite side walls of the box diametrically related to the journal axis providing downwardly extending oppositely faced closed end walls, a bar engaged in said slots and held therein by gravity, and locking elements pivoted to the face of the bar one adjacent each slot, the length of each element slightly less than the distance between its pivotal axis and the top wall of the box permitting said element to be swung over the center toward and against the side walls to hold the bar against accidental upward displacement.

6. A journal having a circumferential groove providing opposing abutment shoulders, a bearing block comprising two sections hinged together and engaged within the groove and about the shaft non-translatably thereon and providing cylindrical roller bearing receiving spaces between the sections and shaft, one of the sections having a longitudinal radial slot for radial introduction of rollers to be interposed between the block and axle.

In witness whereof, I hereunto subscribe my name.

JAMES G. SMITH.